US012559396B2

(12) United States Patent
Barnes et al.

(10) Patent No.: US 12,559,396 B2
(45) Date of Patent: Feb. 24, 2026

(54) SYSTEM AND METHOD FOR INDIRECT MEASUREMENT OF OXYGEN UTILIZATION RATE AND INFLUENT LOAD FOR AERATION CONTROL

(71) Applicant: XYLEM WATER SOLUTIONS U.S.A., INC., Brown Deer, WI (US)

(72) Inventors: Dennis Barnes, Oconomowoc, WI (US); Wenjun Liu, Mars, PA (US)

(73) Assignee: Xylem Water Solutions U.S.A., Inc., Brown Deer, WI (US)

( * ) Notice: Subject to any disclaimer, the term of this patent is extended or adjusted under 35 U.S.C. 154(b) by 372 days.

(21) Appl. No.: 17/955,042

(22) Filed: Sep. 28, 2022

(65) Prior Publication Data

US 2023/0139472 A1    May 4, 2023

Related U.S. Application Data

(60) Provisional application No. 63/250,392, filed on Sep. 30, 2021.

(51) Int. Cl.
*C02F 3/00*        (2023.01)
*C02F 3/30*        (2023.01)
(52) U.S. Cl.
CPC .............. *C02F 3/006* (2013.01); *C02F 3/302* (2013.01); *C02F 2209/04* (2013.01); *C02F 2209/14* (2013.01); *C02F 2209/22* (2013.01); *C02F 2305/06* (2013.01)
(58) Field of Classification Search
CPC .. C02F 3/006; C02F 2209/04; C02F 2209/22; C02F 3/302; C02F 2209/14; C02F 2305/06

USPC ................................. 210/614, 605, 629, 926
See application file for complete search history.

(56) References Cited

U.S. PATENT DOCUMENTS

| | | | |
|---|---|---|---|
| 5,582,734 | A | 12/1996 | Coleman et al. |
| 8,057,674 | B1 | 11/2011 | Leland et al. |
| 9,758,410 | B2 | 9/2017 | Doyle et al. |
| 2009/0090670 | A1 | 4/2009 | Elefritz et al. |
| 2014/0263039 | A1 | 9/2014 | Horst et al. |
| 2016/0257590 | A1 | 9/2016 | Regmi et al. |

(Continued)

FOREIGN PATENT DOCUMENTS

| | | | | |
|---|---|---|---|---|
| CN | 110482686 A | * | 11/2019 | ............ C02F 3/1257 |
| CN | 111018108 A | | 4/2020 | |
| CN | 112744924 A | * | 5/2021 | .............. C02F 3/302 |

(Continued)

OTHER PUBLICATIONS

Yang et al, CN 113415887 A, English machine translation, pp. 1-9 (Year: 2021).*

(Continued)

*Primary Examiner* — Claire A Norris
(74) *Attorney, Agent, or Firm* — The Webb Law Firm

(57) ABSTRACT

A method of optimizing a wastewater treatment plant includes: providing an oxidation ditch having a dissolved oxygen set-point and including: an aeration system having an aerobic zone; and an anoxic zone; measuring the oxidation-reduction potential of the anoxic zone; and based on the measured oxidation-reduction potential: increasing or decreasing the dissolved oxygen set-point; increasing or decreasing a dose of supplemental nutrients; and/or increasing a dose of supplemental carbon or metal salts.

17 Claims, 1 Drawing Sheet

(56)          References Cited

U.S. PATENT DOCUMENTS

2018/0002208 A1     1/2018   Larsen et al.

FOREIGN PATENT DOCUMENTS

| | | | | |
|---|---|---|---|---|
| CN | 113415887 | A | 9/2021 | |
| ES | 2345090 | A1 * | 9/2010 | ............ G05D 21/00 |
| JP | 2006088022 | A | 4/2006 | |
| KR | 100582273 | B1 * | 5/2006 | |
| WO | 2020098997 | A1 | 5/2020 | |

OTHER PUBLICATIONS

Hyun et al, KR 100582273 B1, English machine translation, pp. 1-8 (Year: 2006).*

Gao et al, CN 112744924 A, English machine translation, pp. 1-7 (Year: 2021).*

Lu et al, CN 110482686 A, English machine translation, pp. 1-8 (Year: 2019).*

Yamamura et al, JP 2006088022, English machine translation, pp. 1-4 (Year: 2006).*

Ribes et al, ES 2345090, English machine translation, pp. 1-14 (Year: 2010).*

* cited by examiner

SYSTEM AND METHOD FOR INDIRECT MEASUREMENT OF OXYGEN UTILIZATION RATE AND INFLUENT LOAD FOR AERATION CONTROL

CROSS REFERENCE TO RELATED APPLICATIONS

This application claims priority to U.S. Provisional Patent Application No. 63/250,392, filed Sep. 30, 2021, the disclosure of which is hereby incorporated by reference in its entirety.

BACKGROUND

Technical Field

The present disclosure relates to wastewater, and particularly to systems and methods to quantify the load to a wastewater treatment plant (WWTP).

Description of Related Art

Activated sludge (AS) processes are widely used for both municipal and industrial WWTPs and can experience fluctuations in oxygen demand. This fluctuation in oxygen demand can be caused by changes in the influent mass loads of chemical oxygen demand (COD), biological oxygen demand (BOD), and/or total kjeldahl nitrogen (TKN), seasonal temperature variations, and other factors. WWTPs may also receive intermittent industrial contributions that are deficient in nitrogen and/or phosphorus.

The aeration systems in AS processes consume a lot of electricity, and the electricity cost is more than 50% of the overall operational cost. In order to save energy, dissolved oxygen (DO) or oxidation-reduction potential (ORP) control can be used. Further, the load to a WWTP is dynamically changing hourly, daily, and seasonally. It is clear that that the optimized DO set-points in aerobic zone(s) should also dynamically change. For example, the DO set-points should increase when the load is high, and decrease when the load is low.

The load to a WWTP is a combination of flowrate and concentration, mainly the COD and TKN concentration. Flow rate measurement is usually reliable and has been used previously. Recently, online $NH_3$-N analyzers have been developed and used for dynamic process control. However, $NH_3$-N is only part of TKN, and online $NH_3$-N analyzers, most of which are based on ISE technology, are not reliable, need frequent calibration, and are expensive. Some on-line COD/TOC/BOD analyzers are currently being developed, but are in the very early stage.

SUMMARY

In view of the foregoing, it is desired to find a reliable, cost effective, and low maintenance way to quantify the load to a WWTP.

In some non-limiting embodiments or aspects, a method of optimizing a wastewater treatment plant includes: providing an oxidation ditch having a dissolved oxygen set-point and including: an aeration system having an aerobic zone; and an anoxic zone; measuring the oxidation-reduction potential of the anoxic zone; and based on the measured oxidation-reduction potential: increasing or decreasing the dissolved oxygen set-point; increasing or decreasing a dose of supplemental nutrients; and/or increasing a dose of supplemental carbon or metal salts.

The dissolved oxygen set-point for the aeration system may be increased or decreased based on the measured oxidation-reduction potential. The dissolved oxygen set-point may be increased based on the measured oxidation-reduction potential falling below a range. The dissolved oxygen set-point may be decreased based on the measured oxidation-reduction potential exceeding a range. The dose of supplemental nutrients or the dose of supplemental carbon or metal salts may be increased or decreased based on a change in the dissolved oxygen set-point to maintain the measured oxidation-reduction potential within a range. The supplemental nutrients may include nitrogen and/or phosphorous, where the dose of nitrogen and/or phosphorous may be increased in response to receiving intermittent influent that is nutrient deficient based on the increase in the dissolved oxygen set-point needed to maintain the measured oxidation-reduction potential within a range or the dose of nitrogen and/or phosphorous may be decreased in response to receiving less influent that is nutrient deficient based on the decrease in the dissolved oxygen set-point to maintain the measured oxidation-reduction potential within the range. The dose of supplemental carbon and/or metal salt may be increased in response to receiving an intermittent influent that is carbon deficient based on the increase in the dissolved oxygen set-point to maintain the measured oxidation-reduction potential within a range or the dose of carbon and/or metal salt may be decreased in response to receiving less influent that is carbon deficient based on the decrease in the dissolved oxygen set-point to maintain the measured oxidation-reduction potential within the range.

In some non-limiting embodiments or aspects, a wastewater treatment plant system includes: an inlet zone; an oxidation ditch having a dissolved oxygen set-point and including: an aeration system including an aerobic zone; and an anoxic zone including an oxidation-reduction potential probe; and where the dissolved oxygen set-point is varied and/or in response to receiving more influent that is nutrient or carbon deficient or receiving less influent that is nutrient or carbon deficient, a dose of supplemental nutrients or carbon or metal salts is varied, based on measurements from the oxidation-reduction potential probe.

The dissolved oxygen set-point in the aeration system may be increased or decreased based on the measured oxidation-reduction potential. The dissolved oxygen set-point may be increased based on the measured oxidation-reduction potential falling below a range. The dissolved oxygen set-point may be decreased based on the measured oxidation-reduction potential exceeding a range. In response to receiving more influent that is nutrient deficient or receiving less influent that is nutrient deficient, the dose of supplemental nutrients may be increased or decreased, respectively, based on the change in the dissolved oxygen set-point to maintain the measured oxidation-reduction potential within a range. The supplemental nutrients may include nitrogen and/or phosphorous, where the dose of nitrogen and/or phosphorous may be increased based on the increase in the dissolved oxygen set-point to maintain the measured oxidation-reduction potential within a the range or the dose of nitrogen and/or phosphorous may be decreased based on the decrease in the dissolved oxygen set-point to maintain the measured oxidation-reduction potential within the range. In response to receiving the intermittent influent that is carbon deficient, the dose of carbon and/or metal salt may be increased based on the increase in the dissolved oxygen set-point to maintain the measured oxidation-reduction potential within a range or in response to receiving less influent that is carbon deficient, the dose of carbon and/or metal salt may be decreased based on the increase in the dissolved oxygen set-point to maintain the measured oxidation-reduction potential within the range.

In some non-limiting embodiments or aspects, a method of optimizing a wastewater treatment plant includes: providing a first reactor including a non-aerated anoxic zone and one or more downstream aeration reactors connected to the first reactor, where a mixed liquor containing oxygen is recirculated from the downstream aeration reactors to the first reactor; measuring the oxidation-reduction potential of the anoxic zone; and based on the measured oxidation-reduction potential: increasing or decreasing a dissolved oxygen set-point in the one or more downstream aeration reactors; and/or in response to receiving more influent that is nutrient deficient or receiving less influent that is nutrient deficient, increasing or decreasing, respectively a dose of supplemental nutrients; and/or in response to receiving more influent that is carbon deficient or receiving less influent that is carbon deficient, increasing or decreasing, respectively a dose of supplemental carbon and/or metal salts.

The dissolved oxygen set-point in the one or more downstream aeration reactors may be increased based on the measured oxidation-reduction potential in the anoxic zone falling below a range or the dissolved oxygen set-point in the one or more downstream aeration reactors may be decreased based on the measured oxidation-reduction potential in the anoxic zone exceeding the range. The dose of supplemental nutrients may be increased or decreased based on the change in the dissolved oxygen set-point in the downstream aeration reactors to maintain the measured oxidation-reduction potential in the anoxic zone within a range. The supplemental nutrients may include nitrogen and/or phosphorous, where in response to receiving the intermittent influent that is nutrient deficient, the dose of nitrogen and/or phosphorous may be increased based on the increase in the dissolved oxygen set-point in the downstream aeration reactors to maintain the measured oxidation-reduction potential in the anoxic zone within a the range or, in response to receiving less influent that is nutrient deficient, the dose of nitrogen and/or phosphorous may be decreased based on the decrease in the dissolved set-point in the downstream aeration reactors to maintain the measured oxidation-reduction potential in the anoxic zone within the range. In response to receiving the intermittent influent that is carbon deficient, the dose of supplemental carbon and/or metal salt may be increased based on the increase in the dissolved oxygen set-point in the downstream aeration reactors to maintain the measured oxidation-reduction potential within a range or, in response to receiving less influent that is carbon deficient, the dose of carbon and/or metal salt may be decreased based on the decrease in the dissolved oxygen set-point in the downstream aeration reactors to maintain the measured oxidation-reduction potential in the anoxic zone within the range.

In some non-limiting embodiments or aspects, a wastewater treatment plant system includes: an inlet zone; a first reactor having an initial aerated zone and at least one of a dissolved oxygen probe or an oxidation-reduction potential probe and an airflow meter; optionally, one or more downstream aeration reactors; where a dissolved oxygen set-point of the one or more aeration reactors and/or the initial aerated zone is varied, and/or in response to receiving more influent that is nutrient deficient or receiving less influent that is nutrient deficient, a dose of supplemental nutrients is varied; and/or in response to receiving more influent that is carbon deficient or receiving less influent that is carbon deficient, a dose of supplemental carbon and/or metal salts is varied, based on a change in a calculated estimate of a load of chemical oxygen demand (COD) and total Kjeldahl nitrogen (TKN) being treated, obtained by measuring the airflow rate in the first reactor to maintain a dissolved oxygen or oxygen reduction potential set-point within a range.

The system may include a recycle stream recycling at least a portion of wastewater treated in the one or more downstream aeration reactors to the initial aerated zone. The dissolved oxygen set-point in the initial aerated zone and/or the dissolved oxygen set-point in the one or more downstream aeration reactors may be increased based on an increase in the calculated estimate of the load of COD and TKN being treated, obtained by measuring the airflow rate in the first reactor required to maintain the dissolved oxygen or oxygen reduction potential set-point within the range or the dissolved oxygen set-point in the one or more aeration reactors may be decreased based on a decrease in the calculated estimate of the load of COD and TKN being treated, obtained by measuring the airflow rate in the first reactor to maintain the dissolved oxygen or oxidation reduction potential set-point within the range. In response to receiving more influent that is nutrient deficient or receiving less influent that is nutrient deficient the dose of supplemental nutrients may be increased or decreased, respectively, based on the change in the calculated estimate of the load of COD and TKN being treated, obtained by measuring the airflow rate in the first reactor to maintain the dissolved oxygen or oxygen reduction potential set-point within the range. In response to receiving more influent that is carbon deficient or receiving less influent that is carbon deficient, the dose of supplemental carbon and/or metal salts may be increased or decreased, respectively, based on the change in the calculated estimate of the load of COD and TKN being treated, obtained by measuring the airflow rate in the first reactor to maintain the dissolved oxygen or oxygen reduction potential set-point within the range. The dose of supplemental carbon and/or metal salt may be increased based on the increase in the calculated estimate of the load of COD and TKN being treated, obtained by measuring the airflow rate in the first reactor to maintain the dissolved oxygen or oxidation reduction potential set-point within the range or the dose of supplemental carbon and/or metal salts may be decreased based on the decrease in the calculated estimate of the load of COD and TKN being treated, obtained by measuring the airflow rate in the first reactor to maintain the fixed dissolved oxygen or oxidation reduction potential set-point within the range.

Various preferred and non-limiting examples or aspects of the present disclosure will now be described and set forth in the following numbered clauses:

Clause 1: A method of optimizing a wastewater treatment plant, comprising: providing an oxidation ditch having a dissolved oxygen set-point and comprising: an aeration system comprising an aerobic zone; and an anoxic zone; measuring the oxidation-reduction potential of the anoxic zone; and based on the measured oxidation-reduction potential: increasing or decreasing the dissolved oxygen set-point; increasing or decreasing a dose of supplemental nutrients; and/or increasing a dose of supplemental carbon or metal salts.

Clause 2: The method of clause 1, wherein the dissolved oxygen set-point for the aeration system is increased or decreased based on the measured oxidation-reduction potential.

Clause 3: The method of clause 2, wherein the dissolved oxygen set-point is increased based on the measured oxidation-reduction potential falling below a range.

Clause 4: The method of clause 2, wherein the dissolved oxygen set-point is decreased based on the measured oxidation-reduction potential exceeding a range.

Clause 5: The method of any of clauses 1-4, wherein the dose of supplemental nutrients or the dose of supplemental carbon or metal salts is increased or decreased based on a change in the dissolved oxygen set-point to maintain the measured oxidation-reduction potential within a range.

Clause 6: The method of clause 5, wherein the supplemental nutrients comprise nitrogen and/or phosphorous, wherein the dose of nitrogen and/or phosphorous is increased in response to receiving intermittent influent that is nutrient deficient based on the increase in the dissolved oxygen set-point needed to maintain the measured oxidation-reduction potential within a range or the dose of nitrogen and/or phosphorous is decreased in response to receiving less influent that is nutrient deficient based on the decrease in the dissolved oxygen set-point to maintain the measured oxidation-reduction potential within the range.

Clause 7: The method of clause 5 or 6, wherein the dose of supplemental carbon and/or metal salt is increased in response to receiving an intermittent influent that is carbon deficient based on the increase in the dissolved oxygen set-point to maintain the measured oxidation-reduction potential within a range or the dose of carbon and/or metal salt is decreased in response to receiving less influent that is carbon deficient based on the decrease in the dissolved oxygen set-point to maintain the measured oxidation-reduction potential within the range.

Clause 8: A wastewater treatment plant system, comprising: an inlet zone; an oxidation ditch having a dissolved oxygen set-point and comprising: an aeration system comprising an aerobic zone; and an anoxic zone comprising an oxidation-reduction potential probe; and wherein the dissolved oxygen set-point is varied and/or in response to receiving more influent that is nutrient or carbon deficient or receiving less influent that is nutrient or carbon deficient, a dose of supplemental nutrients or carbon or metal salts is varied, based on measurements from the oxidation-reduction potential probe.

Clause 9: The system of clause 8, wherein the dissolved oxygen set-point in the aeration system is increased or decreased based on the measured oxidation-reduction potential.

Clause 10: The system of clause 9, wherein the dissolved oxygen set-point is increased based on the measured oxidation-reduction potential falling below a range.

Clause 11: The system of clause 9, wherein the dissolved oxygen set-point is decreased based on the measured oxidation-reduction potential exceeding a range.

Clause 12: The system of any of clauses 8-11, wherein in response to receiving more influent that is nutrient deficient or receiving less influent that is nutrient deficient, the dose of supplemental nutrients is increased or decreased, respectively, based on the change in the dissolved oxygen set-point to maintain the measured oxidation-reduction potential within a range.

Clause 13: The system of clause 12, wherein the supplemental nutrients comprise nitrogen and/or phosphorous, wherein the dose of nitrogen and/or phosphorous is increased based on the increase in the dissolved oxygen set-point to maintain the measured oxidation-reduction potential within a range or the dose of nitrogen and/or phosphorous is decreased based on the decrease in the dissolved oxygen set-point to maintain the measured oxidation-reduction potential within the range.

Clause 14: The system of any of clauses 8-13, wherein in response to receiving the intermittent influent that is carbon deficient, the dose of carbon and/or metal salt is increased based on the increase in the dissolved oxygen set-point to maintain the measured oxidation-reduction potential within a range or in response to receiving less influent that is carbon deficient, the dose of carbon and/or metal salt is decreased based on the increase in the dissolved oxygen set-point to maintain the measured oxidation-reduction potential within the range.

Clause 15: A method of optimizing a wastewater treatment plant, comprising: providing a first reactor comprising a non-aerated anoxic zone and one or more downstream aeration reactors connected to the first reactor, wherein a mixed liquor containing oxygen is recirculated from the downstream aeration reactors to the first reactor; measuring the oxidation-reduction potential of the anoxic zone; and based on the measured oxidation-reduction potential: increasing or decreasing a dissolved oxygen set-point in the one or more downstream aeration reactors; and/or in response to receiving more influent that is nutrient deficient or receiving less influent that is nutrient-deficient, increasing or decreasing, respectively a dose of supplemental nutrients; and/or in response to receiving more influent that is carbon deficient or receiving less influent that is carbon deficient, increasing or decreasing, respectively a dose of supplemental carbon and/or metal salts.

Clause 16: The method of clause 15, wherein the dissolved oxygen set-point in the one or more downstream aeration reactors is increased based on the measured oxidation-reduction potential in the anoxic zone falling below a range or the dissolved oxygen set-point in the one or more downstream aeration reactors is decreased based on the measured oxidation-reduction potential in the anoxic zone exceeding the range.

Clause 17: The method of clause 15 or 16, wherein the dose of supplemental nutrients is increased or decreased based on the change in the dissolved oxygen set-point in the downstream aeration reactors to maintain the measured oxidation-reduction potential in the anoxic zone within a range.

Clause 18: The method of clause 17, wherein the supplemental nutrients comprise nitrogen and/or phosphorous, wherein in response to receiving the intermittent influent that is nutrient deficient, the dose of nitrogen and/or phosphorous is increased based on the increase in the dissolved oxygen set-point in the downstream aeration reactors to maintain the measured oxidation-reduction potential in the anoxic zone within a the range or, in response to receiving less influent that is nutrient deficient, the dose of nitrogen and/or phosphorous is decreased based on the decrease in the dissolved set-point in the downstream aeration reactors to maintain the measured oxidation-reduction potential in the anoxic zone within the range.

Clause 19: The method of any of clauses 15-18, wherein in response to receiving the intermittent influent that is carbon deficient, the dose of supplemental carbon and/ or metal salt is increased based on the increase in the dissolved oxygen set-point in the downstream aeration reactors to maintain the measured oxidation-reduction potential within a range or, in response to receiving less influent that is carbon deficient, the dose of carbon and/or metal salt is decreased based on the decrease in the dissolved oxygen set-point in the downstream aeration reactors to maintain the measured oxidation-reduction potential in the anoxic zone within the range.

Clause 20: A wastewater treatment plant system, comprising: an inlet zone; a first reactor comprising an initial aerated zone and at least one of a dissolved oxygen probe or an oxidation-reduction potential probe and an airflow meter; optionally, one or more downstream aeration reactors; wherein a dissolved oxygen set-point of the one or more aeration reactors and/or the initial aerated zone is varied, and/or in response to receiving more influent that is nutrient deficient or receiving less influent that is nutrient deficient, a dose of supplemental nutrients is varied; and/or in response to receiving more influent that is carbon deficient or receiving less influent that is carbon deficient, a dose of supplemental carbon and/or metal salts is varied, based on a change in a calculated estimate of a load of chemical oxygen demand (COD) and total Kjeldahl nitrogen (TKN) being treated, obtained by measuring the airflow rate in the first reactor to maintain a dissolved oxygen or oxygen reduction potential set-point within a range.

Clause 21: The system of clause 20, further comprising a recycle stream recycling at least a portion of wastewater treated in the one or more downstream aeration reactors to the initial aerated zone.

Clause 22: The system of clause 20 or 21, wherein the dissolved oxygen set-point in the initial aerated zone and/or the dissolved oxygen set-point in the one or more downstream aeration reactors is increased based on an increase in the calculated estimate of the load of COD and TKN being treated, obtained by measuring the airflow rate in the first reactor required to maintain the dissolved oxygen or oxygen reduction potential set-point within the range or the dissolved oxygen set-point in the one or more aeration reactors is decreased based on a decrease in the calculated estimate of the load of COD and TKN being treated, obtained by measuring the airflow rate in the first reactor to maintain the dissolved oxygen or oxidation reduction potential set-point within the range.

Clause 23: The system of any of clauses 20-22, wherein in response to receiving more influent that is nutrient deficient or receiving less influent that is nutrient deficient the dose of supplemental nutrients is increased or decreased, respectively, based on the change in the calculated estimate of the load of COD and TKN being treated, obtained by measuring the airflow rate in the first reactor to maintain the dissolved oxygen or oxygen reduction potential set-point within the range.

Clause 24: The system of any of clauses 20-22, in response to receiving more influent that is carbon deficient or receiving less influent that is carbon deficient, the dose of supplemental carbon and/or metal salts is increased or decreased, respectively, based on the change in the calculated estimate of the load of COD and TKN being treated, obtained by measuring the airflow rate in the first reactor to maintain the dissolved oxygen or oxygen reduction potential set-point within the range.

Clause 25: The system of clause 24, wherein the dose of supplemental carbon and/or metal salt is increased based on the increase in the calculated estimate of the load of COD and TKN being treated, obtained by measuring the airflow rate in the first reactor to maintain the dissolved oxygen or oxidation reduction potential set-point within the range or the dose of supplemental carbon and/or metal salts is decreased based on the decrease in the calculated estimate of the load of COD and TKN being treated, obtained by measuring the airflow rate in the first reactor to maintain the fixed dissolved oxygen or oxidation reduction potential set-point within the range.

DETAILED DESCRIPTION

Figure 1:
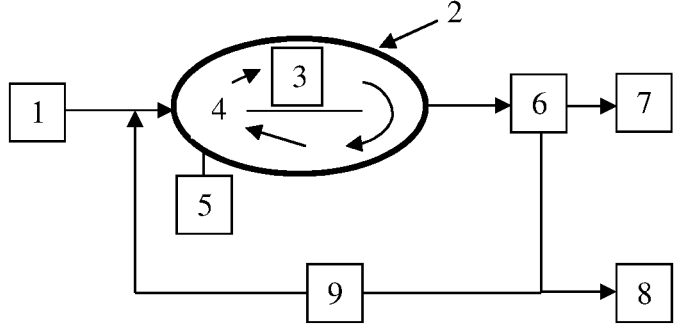
FIG. 1 is a schematic diagram of a wastewater treatment plant according to some non-limiting embodiments or aspects.

For purposes of the description hereinafter, the terms "upper," "lower." "right," "left," "vertical," "horizontal," "top," "bottom," "lateral." "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and the plural encompasses the singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise.

Acrated bioreactors in WWTPs may be separated into many zones, where each zone includes a separate DO control set-point, air drop pipe, and airflow meter. Certain designs like this may allow each zone to operate at a different DO set-point to save electricity, as well as to improve biological nitrogen and phosphorus removal. The ORP and/or DO set-points in each zone may then be optimized to maximize the benefit of energy saving and biological nutrient removal (BNR).

For example, ORP probes may be used to indirectly detect changes in oxygen demand. This information may then be used to dynamically adjust process control parameters such as aeration control set-points and/or chemical dosing rates of, for example, supplemental nutrients, alkalinity, and/or metal salts.

The present disclosure is directed to a method of optimizing a wastewater treatment plant, comprising: providing an oxidation ditch having a dissolved oxygen set-point and comprising: an aeration system comprising an aerobic zone; and an anoxic zone; measuring the oxidation-reduction potential of the anoxic zone; and based on the measured oxidation-reduction potential: increasing or decreasing the dissolved oxygen set-point; increasing or decreasing a dose of supplemental nutrients; and/or increasing a dose of supplemental carbon or metal salts.

The present disclosure is also directed to a wastewater treatment plant system, comprising: an inlet zone; an oxidation ditch having a dissolved oxygen set-point and comprising: an aeration system comprising an aerobic zone; and an anoxic zone comprising an oxidation-reduction potential probe; and wherein the dissolved oxygen set-point is varied and/or in response to receiving more or less intermittent influent that is nutrient or carbon deficient, a dose of supplemental nutrients or carbon or metal salts is varied, based on measurements from the oxidation-reduction potential probe.

Referring to FIG. 1, in some non-limiting embodiments, in a single-reactor simultaneous nitrification and denitrification (SNDN) process, nitrification and denitrification may occur in a single oxidation ditch. Wastewater, or influent, may enter the wastewater treatment system to an inlet zone 1. From the inlet zone 1, the wastewater may then enter a single oxidation ditch 2. A fraction of the ditch volume may be covered with a fine bubble diffused aeration system 3 (also referred to as the aerobic zone 3) to produce aerobic conditions, which will remove the majority of the ammonia and convert to nitrate. As the wastewater circulates away from the diffuser grid, the DO will be consumed, resulting in anoxic conditions needed for denitrification in an anoxic zone 4. As such, ORP probes 5 may be placed in the anoxic zone 4 to indirectly measure the load being treated.

These ORP measurements may then be used to adjust process control parameters. For example, a drop in the ORP level in the anoxic zone 4 as indicated by the ORP probes 5 may be an indirect indication that the oxygen uptake rate (OUR) in the oxidation ditch 2 has increased. If this is the case, the DO set-point may be increased, so that the aeration system 3 will transfer more oxygen and increase the ORP level in the anoxic zone 4 to a desired range, such as a range defined by the operator. The DO set-point may be increased in the aerobic zone 3. In this way, if the ORP level in the anoxic zone 4 falls below a user-defined range, the DO set-point in the aerobic zone 3 may be increased so that as mixed liquor circulates around the oxidation ditch 2, the ORP level in anoxic zone 4 will increase to a desired range defined by the operator. The opposite is also true; i.e., a spike in the ORP level in the anoxic zone 4 may be an indirect indication that the OUR in the oxidation ditch 2 has decreased, such that the DO set-point may be decreased in the aerobic zone 3. In this way, if the ORP level in the anoxic zone 4 exceeds a user-defined range, the DO set-point in the aerobic zone 3 may be decreased. Dynamically varying the DO set-point in the aerobic zone 3 to maintain an ORP set-point in the anoxic zone 4 may help optimize total nitrogen removal. These adjustments in the target DO set-point may or may not also coincide with automatic switching of different aeration grids 3 within the oxidation ditch 2 to "on" or "off".

As another example, in addition to or instead of adjusting DO set-points upwards or downwards, the indirect measurement of OUR in the anoxic zone 4 may also be used to control chemical dose rates. The chemical dose rates to any zone may be increased or decreased based on the measurements. For example, in a WWTP that receives intermittent high-strength wastewater contributions that are deficient in nitrogen and/or phosphorus, the dose of supplemental nutrients (including but not limited to urea for nitrogen and/or phosphoric acid for phosphorus) may be increased when the DO set-point is also increased to account for higher OUR rates. For example, the influent deficient in nutrients may have an unfavorable ratio of BOD to N or P, such as <5 parts N per 100 parts BOD or <1 part P per 100 parts BOD. A non-limiting example of a nutrient deficient influent may comprise wastewater from a brewery that has lots of BOD but very little nitrogen or phosphorous. Thus, the dose of nitrogen and/or phosphorous may be increased based on the level of increase of the DO set-point required to maintain the ORP within a user-defined range. Similarly, the dose of supplemental nutrients (nitrogen and/or phosphorus) may be decreased when the DO set-point is decreased for lower OUR rates. Thus, the dose of nitrogen and/or phosphorous may be decreased in response to receiving less wastewater deficient in nitrogen and/or phosphorous based on the level of decrease of the DO set-point required to maintain the measured oxidation-reduction potential within a user-defined range.

For WWTPs that receive intermittent discharges of high-strength wastewater that are carbon deficient, resulting in a low ratio of BOD to TKN and/or BOD/total phosphorus (TP), the dose of supplemental carbon, including but not limited to methanol and/or metal salts, including but not limited to aluminum sulfate, may be increased at times when the DO set-point is increased to account for higher OUR rates. For example, the influent deficient in carbon may have less than 4-5 parts BOD per part N and/or less than 20 parts BOD per part P. A non-limiting example of a carbon deficient influent may comprise wastewater from a dairy plant that has a somewhat higher BOD but very high phosphorous. Thus, the dose of carbon and/or metal salt may be increased based on the level of increase of the DO set-point required to maintain the measured oxidation-reduction potential within a user-defined range. Likewise, the dose of supplemental carbon and/or metal salts may be decreased at times when the DO set-point is decreased during lower OUR rates for WWTPs that receive less discharges to the influent of high-strength wastewater that are carbon deficient. Thus, the dose of carbon and/or metal salt may be decreased based on the level of decrease of the DO set-point required to maintain the measured oxidation-reduction potential within a user-defined range.

The following Table 1 summarizes exemplary actions that may be undertaken in the system of FIG. 1 in response to certain ORP measurements in the anoxic zone 4.

TABLE 1

| ORP Measurement in Anoxic Zone | Response |
| --- | --- |
| ORP above user-defined range | Decrease the DO set-point in the aerobic zone and/or<br>Depending on the magnitude of DO decrease required, decrease the nitrogen and/or phosphorous dose in any zone (for intermittent periods when less influent wastewater that is nutrient deficient is received)<br>and/or<br>Depending on the magnitude of DO decrease required, decrease the supplemental carbon and/or metal salt dose in any zone (for |

TABLE 1-continued

| ORP Measurement in Anoxic Zone | Response |
| --- | --- |
| | intermittent periods when less influent wastewater that is carbon deficient is received) |
| ORP below user-defined range | Increase the DO set-point in the aerobic zone and/or Depending on the magnitude of DO increase required, increase the nitrogen and/or phosphorous dose in any zone (for intermittent periods when influent wastewater is nutrient deficient) and/or Depending on the magnitude of DO increase required, increase the supplemental carbon and/or metal salt dose in any zone (for intermittent periods when influent wastewater is carbon deficient) |

With continued reference to FIG. 1, after the wastewater leaves the oxidation ditch 2, the wastewater may enter a solids/liquid separation unit, including but not limited to a clarifier or filter (zone 6). Zone 6 may include any clarifier or filter known in the art. Any of the various embodiments of clarifiers or filters described herein or known in the art may be included in the wastewater treatment system.

According to certain non-limiting embodiments of the present disclosure, the processes and/or systems may include a filter, such as a filtering/thickening machine (FTM). One possible version of the FTM is substantially described in Italian Patent Application Numbers 102018000010259, filed Nov. 12, 2018; 102018000010430, filed Nov. 19, 2018; 102019000011046, filed Jul. 5, 2019; and 102019000011058, filed Jul. 5, 2019. A preferred non-limiting embodiment of an FTM may be found in PCT Application Number PCT/EP2019/074913, filed Sep. 17, 2019, which is hereby incorporated by reference in its entirety.

Once liquid/solids separation occurs in zone 6, the wastewater may be transported external of the zone 6 as effluent 7. The "effluent" 7 is the wastewater after liquid/solids separation. A sludge may also be produced from liquid/solids separation in zone 6. The "sludge" is an aggregate of the contaminants and suspended solids in the wastewater that is separated from the wastewater by liquid/solids separation and collects in the effluent zone 6. The sludge may concentrate in zone 6 and be transported external of the liquid/solids separation zone 6. At least a portion of the sludge may be transported external to liquid/solids separation zone 6 and out of the wastewater treatment plant as waste activated sludge 8. A portion of the sludge may be transported external of the liquid/solids separation zone 6 and back to the inlet zone 1 and/or the oxidation ditch 2 as return activated sludge 9. The return activated sludge 9 may be transferred back to the inlet zone 1 and/or oxidation ditch 2 by a transfer pipe and a pump. The return activated sludge 9 may be transferred to the inlet zone 1 and/or oxidation ditch 2 in order to maintain a certain level of total suspended solids in the wastewater.

The present disclosure is also directed to a method of optimizing a wastewater treatment plant, comprising: providing a first reactor comprising a non-aerated anoxic zone and one or more downstream aeration reactors connected to the first reactor, wherein a mixed liquor containing oxygen is recirculated from the downstream aeration reactors to the first reactor; measuring the oxidation-reduction potential of the anoxic zone; and based on the measured oxidation-reduction potential: increasing or decreasing a dissolved oxygen set-point in the one or more downstream aeration reactors; and/or in response to receiving more or less influent that is nutrient deficient, increasing or decreasing, respectively a dose of supplemental nutrients; and/or in response to receiving more or less intermittent influent that is carbon deficient, increasing or decreasing. respectively a dose of supplemental carbon and/or metal salts.

The present disclosure is also directed to a wastewater treatment plant system, comprising: an inlet zone; a first reactor comprising an initial aerated zone and at least one of a dissolved oxygen probe or an oxidation-reduction potential probe and an airflow meter; one or more downstream aeration reactors; wherein a dissolved oxygen set-point of the one or more aeration reactors is varied, and/or in response to receiving more or less intermittent influent that is nutrient deficient, a dose of supplemental nutrients is varied; and/or in response to receiving more or less intermittent influent that is carbon deficient, a dose of supplemental carbon and/or metal salts is varied, based on a change in a calculated estimate of a load of chemical oxygen demand (COD) and total Kjeldahl nitrogen (TKN) being treated, obtained by measuring the airflow rate in the first reactor to maintain a dissolved oxygen or oxygen reduction potential set-point within a range.

Figure 2:
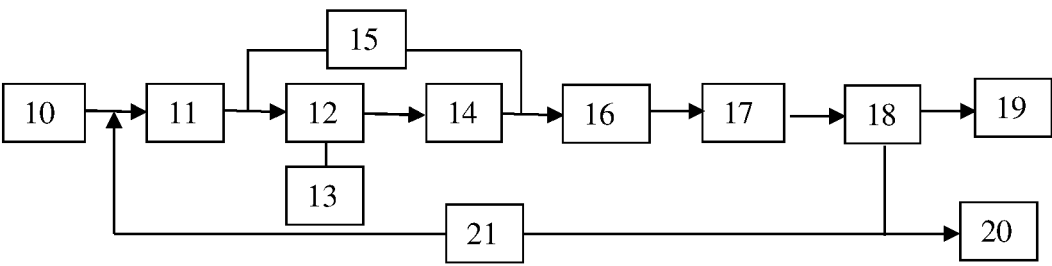
FIG. 2 is a schematic diagram of a wastewater treatment plant according to some non-limiting embodiments or aspects.

Referring to FIG. 2, in some non-limiting embodiments, an activated sludge process may include two or more aerated stages. The wastewater may enter the wastewater treatment system into an inlet zone 10. From the inlet zone 10, the wastewater may enter an optional anaerobic zone 11 in which the wastewater is exposed to anaerobic conditions. After the optional anaerobic zone 11, the wastewater may then enter a first reactor 12. The first reactor 12 may be a non-aerated anoxic zone. An ORP probe 13 may be placed in the first reactor 12 in order to indirectly measure the load being treated. A downstream aerated reactor 14 supplies additional oxygen to the system, and mixed liquor containing oxygen is recirculated from reactor 14 to reactor 12.

The ORP measurements from the ORP probes 13 may be used to control DO set-points for downstream stages. The aeration control system failing to maintain the ORP level in the first reactor 12 in the desired range may be an indirect indication that the OUR in the system has increased, in which case the DO set-points in one or more downstream aeration reactors 14 may be increased. In this way, if the ORP level in the first reactor 12 falls below a user-defined range, the DO set-point in the downstream aerobic reactors 14 may be increased. The opposite is also true, the aeration control system maintaining the ORP level in the first reactor 12 in the desired range may be an indirect indication that the OUR in the system has increased, in which case the DO set-points in one or more downstream aeration reactors 14 may be decreased. In this way, if the ORP level in the first reactor 12 exceeds a user-defined range, the DO set-point in the downstream aerobic reactors 14 may be decreased.

As the DO concentration in downstream aeration reactors 14 is increased, the amount of DO recirculated to the first reactor 12 via wastewater recycled thereto by an internal mixed liquor recycle stream 15 may help the aeration control system to increase the ORP measurements in the first reactor 12, so that the ORP target is reached for the increased load condition. Dynamically varying the DO set-point in the aeration reactors 14 to maintain an ORP set-point in the first reactor 12 may help to optimize the total nitrogen removal.

As yet another example, besides adjusting DO set-points upwards or downwards, the indirect measurement of OUR, via the ORP measurements of the ORP probe 13, may be used to control chemical dose rates. The chemical dose rates to any zone may be increased or decreased based on the measurements. For example, at a plant that receives intermittent high-strength wastewater contributions that are deficient in nitrogen and/or phosphorus, at times when the DO set-point in downstream aeration reactors 14 is increased to account for higher OUR rates, the dose of supplemental nutrients, such as nitrogen and/or phosphorus, may be increased. Thus, the dose of nitrogen and/or phosphorous may be increased based on the measured oxidation-reduction potential falling below a user-defined range. The opposite is also true, at times when the DO set-point in aeration reactors 14 is decreased (based on receiving less nutrient deficient wastewater contributions) to account for lower OUR rates, the dose of supplemental nutrients, such as nitrogen and/or phosphorus, may be decreased for such plants. Thus, the dose of nitrogen and/or phosphorous may be decreased based on the measured oxidation-reduction potential exceeding a user-defined range.

Similarly, for plants that intermittently receive high ammonia and/or phosphorus concentrations and an unfavorable ratio of BOD to TKN and/or BOD/TP during intermittent discharges to the influent of high-strength wastewater, when the DO set-point in downstream aeration reactors 14 is increased to account for higher OUR rates, the dose of supplemental carbon and/or metal salts may be increased. Thus, the dose of carbon and/or metal salt may be increased based on the measured oxidation-reduction potential falling below a user-defined range. When the DO set-point in downstream aeration reactors 14 is decreased to account for lower OUR rates, the dose of supplemental carbon and/or metal salts may be decreased. Thus, the dose of carbon and/or metal salt may be decreased based on the measured oxidation-reduction potential exceeding a user-defined range.

The following Table 2 summarizes exemplary actions that may be undertaken in the system of FIG. 2 in response to certain ORP measurements in the first reactor 12.

TABLE 2

| ORP Measurement in First Reactor | Response |
| --- | --- |
| Above user-defined range | Decrease the DO set-point in the one or more downstream aeration reactors and/or Depending on the magnitude of DO decrease in reactor 14 required, decrease the nitrogen and/or phosphorous dose in any zone (for intermittent periods when less influent wastewater that is nutrient deficient is received) and/or Depending on the magnitude of DO decrease in reactor 14 required, decrease the supplemental carbon and/or metal salt dose in any zone (for intermittent periods when less influent wastewater that is carbon deficient is received) |
| Below user-defined range | Increase the DO set-point in the one or more downstream aeration reactors and/or Depending on the magnitude of DO increase required, increase the nitrogen and/or phosphorous dose in any zone (for intermittent periods when influent wastewater is nutrient deficient) and/or |

TABLE 2-continued

| ORP Measurement in First Reactor | Response |
| --- | --- |
| | Depending on the magnitude of DO increase required, increase the supplemental carbon and/or metal salt dose in any zone (for intermittent periods when influent wastewater is carbon deficient) |

Referring to FIG. 2 again, in some non-limiting embodiments, an activated sludge process may include two or more aerated stages. The wastewater may enter the wastewater treatment system into an inlet zone 10. From the inlet zone 10, the wastewater may enter an optional anaerobic zone 11 in which the wastewater is exposed to anaerobic conditions. After the optional anaerobic zone 11, the wastewater may then enter a first reactor 12. In this case, the first reactor 12 may be an initial aerated zone. An airflow meter 13 may be used to take airflow measurements (including but not limited to scfm or ncmh) instead of or in addition to ORP measurements from an ORP probe 13. The airflow measurements taken by the airflow meter 13 may also be used to adjust the process control parameters. Using measurements from an airflow meter 13 to estimate the load being treated to control WWTPs may have certain advantages. WWTPs may already include an airflow meter 13, such that there is no additional costs to the WWTP to take such measurements. Further, airflow meters 13 may be more reliable than on-line $NH_3$-N analyzers and do not need frequently calibrated. Airflow meters 13 may also measure the overall load effect of TKN and COD, because both COD and TKN consume oxygen. The following equation is relevant:

$$dDO/dt = \text{Oxygen transfer rate} - OUR$$

where at fixed the DO set-point, $dDO/dt=0$, in which case Oxygen transfer rate=OUR.

Therefore, at fixed DO set-point, the airflow rate is directly proportional to the oxygen utilization rate (OUR), which is directly related to COD and TKN load, as a mechanical virtual load instrument. As such, an airflow meter as a virtual load instrument may be more accurate than just $NH_3$-N measurements from on-line $NH_3$-N analyzers. The airflow measurements may allow for an aerated anoxic zone 12 to run at low DO, such as 0.2 mg/L, so that SNDN may be achieved.

With continued reference to FIG. 2, wastewater that exits the one or more aeration reactors 14 that does not enter the internal mixed liquor recycle stream 15, may enter an optional post anoxic zone 16 to be subjected to anoxic conditions. Further, after the one or more aeration reactors 14 and/or the optional post anoxic zone 16, the wastewater may enter an optional post aerobic zone 17 to be subjected to aerobic conditions. After the wastewater exits the one or more aeration reactors 14, and optional after the post anoxic zone 16 and/or the post aerobic zone 17, the wastewater may enter a solids/liquid separation unit, including but not limited to a clarifier or filter, zone 18.

The liquid/solids separation zone 18 may include any clarifier or filter known in the art. Any of the various embodiments of clarifiers or filters described herein or known in the art may be included in the wastewater treatment system. According to certain non-limiting embodiments of the present disclosure, the processes and/or systems may include a filter, such as a filtering/thickening machine (FTM). One possible version of the FTM is substantially described in Italian Patent Application Numbers 102018000010259, filed Nov. 12, 2018; 102018000010430, filed Nov. 19, 2018; 102019000011046, filed Jul. 5, 2019; and 102019000011058, filed Jul. 5, 2019. A preferred non-limiting embodiment of an FTM may be found in PCT Application Number PCT/EP2019/074913, filed Sep. 17, 2019, which is hereby incorporated by reference in its entirety.

Once liquid/solids separation occurs in zone 18, the wastewater may be transported external of the liquid/solids separation zone 18 as an effluent 19. A sludge may also be produced from liquid/solids separation zone 18. The sludge may concentrate in liquid/solids separation zone 18 and be transported external of liquid/solids separation zone 18. At least a portion of the sludge may be transported external to the liquid/solids separation zone 18 and out of the waste-water treatment plant as waste activated sludge 20. A portion of the sludge may be transported external of liquid/solids separation zone 18 and back to the inlet zone 10, the optional anaerobic zone 11, and/or the first reactor (anoxic zone or initial aerated zone) 12 as return activated sludge 21. The return activated sludge 21 may be transferred back to the inlet zone 10, the optional anaerobic zone 11, and/or the first reactor (anoxic zone or initial aerated zone) 12 by a transfer pipe and a pump. The return activated sludge 21 may be transferred to the inlet zone 10, the optional anaerobic zone 11, and/or the first reactor (anoxic zone or initial aerated zone) 12 in order to maintain a certain level of total suspended solids in the wastewater.

More advanced control options may also provide additional benefits. An activated sludge model (ASM) and oxygen transfer model may be combined to save energy and improve nutrient removal of a WWTP. Airflow meters 13 may also be used in another aerobic zone, and an $NH_3$-N analyzer may be used to dynamically calibrate the ASM based control system. $NH_3$-N based feedback control may also be used as a safety trim, if necessary.

It is to be understood that the invention may assume various alternative variations, except where expressly specified to the contrary. It is also to be understood that the specific devices illustrated in the attached drawings, and described in the specification, are simply exemplary embodiments of the invention. Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope thereof. For example, it is to be understood that the present invention contemplates that, to the extent possible, one or more features of any embodiment can be combined with one or more features of any other embodiment. The embodiments of the invention described herein above in the context of the preferred embodiments are not to be taken as limiting the embodiments of the invention to all of the provided details thereof, since modification and variations thereof may be made without departing from the spirit and scope of the embodiments of the invention.

The invention claimed is:

1. A method of optimizing a wastewater treatment plant, comprising:
    providing an oxidation ditch comprising:
        a first fraction of a ditch volume of the oxidation ditch comprising an aeration system comprising an aerobic zone having a dissolved oxygen set-point, the aeration system producing aerobic conditions in the aerobic zone; and
        a second fraction of the ditch volume of the oxidation ditch comprising an anoxic zone;
    indirectly measuring an oxygen uptake rate in the aerobic zone by measuring the oxidation-reduction potential of the anoxic zone; and
    based on the indirectly measured oxygen uptake rate in the aerobic zone:
        increasing or decreasing the dissolved oxygen set-point in the aerobic zone; and
        increasing or decreasing a dose of supplemental nutrients and/or a dose of supplemental carbon or metal salts.

2. The method of claim 1, wherein the dissolved oxygen set-point for the aeration system is increased or decreased based on the measured oxidation-reduction potential.

3. The method of claim 2, wherein the dissolved oxygen set-point is increased based on the measured oxidation-reduction potential falling below a range.

4. The method of claim 2, wherein the dissolved oxygen set-point is decreased based on the measured oxidation-reduction potential exceeding a range.

5. The method of claim 1, wherein the dose of supplemental nutrients is increased or decreased based on a change in the dissolved oxygen set-point to maintain the measured oxidation-reduction potential within a range.

6. The method of claim 5, wherein the supplemental nutrients comprise nitrogen and/or phosphorous, wherein the dose of nitrogen and/or phosphorous is increased in response to receiving intermittent influent that is nutrient deficient based on the increase in the dissolved oxygen set-point needed to maintain the measured oxidation-reduction potential within a range or the dose of nitrogen and/or phosphorous is decreased in response to receiving less influent that is nutrient deficient based on the decrease in the dissolved oxygen set-point to maintain the measured oxidation-reduction potential within the range.

7. The method of claim 1, wherein the dissolved oxygen set-point in the aerobic zone is not increased or decreased based on a direct measurement of the oxygen uptake rate in the aerobic zone.

8. A wastewater treatment plant system, comprising:
    an inlet zone;
    an oxidation ditch comprising:
        a first fraction of a ditch volume of the oxidation ditch comprising an aeration system comprising an aerobic zone having a dissolved oxygen set-point, the aeration system producing aerobic conditions in the aerobic zone; and
        a second fraction of the ditch volume of the oxidation ditch comprising an anoxic zone comprising an oxidation-reduction potential probe configured to indirectly measure an oxygen uptake rate in the aerobic zone by measuring the oxidation-reduction potential of the anoxic zone;
    wherein the dissolved oxygen set-point in the aerobic zone is varied based on the indirect measurement from the oxidation-reduction potential probe in the anoxic zone; and
    wherein a dose of supplemental nutrients and/or a dose of supplemental carbon or metal salts is increased or decreased based on the indirect measurement from the oxidation reduction potential probe in the anoxic zone.

9. The system of claim 8, wherein the dissolved oxygen set-point in the aeration system is increased or decreased based on the measured oxidation-reduction potential.

10. The system of claim 9, wherein the dissolved oxygen set-point is increased based on the measured oxidation-reduction potential falling below a range.

11. The system of claim 9, wherein the dissolved oxygen set-point is decreased based on the measured oxidation-reduction potential exceeding a range.

12. The system of claim 8, wherein in response to receiving more or less intermittent influent that is nutrient deficient, the dose-a dose of supplemental nutrients is increased or decreased, respectively, based on the change in the dissolved oxygen set-point to maintain the measured oxidation-reduction potential within a range.

13. The system of claim 12, wherein the supplemental nutrients comprise nitrogen and/or phosphorous, wherein the dose of nitrogen and/or phosphorous is increased based on the increase in the dissolved oxygen set-point to maintain the measured oxidation-reduction potential within a range or the dose of nitrogen and/or phosphorous is decreased based on the decrease in the dissolved oxygen set-point to maintain the measured oxidation-reduction potential within the range.

14. A method of optimizing a wastewater treatment plant, comprising:

providing a first reactor comprising a non-aerated anoxic zone and one or more downstream aeration reactors connected to the first reactor, wherein a mixed liquor containing oxygen is recirculated from the downstream aeration reactors to the first reactor;

indirectly measuring an oxygen uptake rate in the aerobic zone by measuring the oxidation-reduction potential of the anoxic zone; and based on the indirectly measured oxidation-reduction potential of the anoxic zone:

increasing or decreasing a dissolved oxygen set-point in the one or more downstream aeration reactors; and increasing or decreasing a dose of supplemental nutrients and/or a dose of supplemental carbon or metal salts.

15. The method of claim 14, wherein the dissolved oxygen set-point in the one or more downstream aeration reactors is increased based on the measured oxidation-reduction potential in the anoxic zone falling below a range or the dissolved oxygen set-point in the one or more downstream aeration reactors is decreased based on the measured oxidation-reduction potential in the anoxic zone exceeding the range.

16. The method of claim 14, wherein the dose of supplemental nutrients is increased or decreased based on the change in the dissolved oxygen set-point in the downstream aeration reactors to maintain the measured oxidation-reduction potential in the anoxic zone within a range.

17. The method of claim 16, wherein the supplemental nutrients comprise nitrogen and/or phosphorous, wherein in response to receiving the intermittent influent that is nutrient deficient, the dose of nitrogen and/or phosphorous is increased based on the increase in the dissolved oxygen set-point in the downstream aeration reactors to maintain the measured oxidation-reduction potential in the anoxic zone within the range or, in response to receiving less influent that is nutrient deficient, the dose of nitrogen and/or phosphorous is decreased based on the decrease in the dissolved set-point in the downstream aeration reactors to maintain the measured oxidation-reduction potential in the anoxic zone within the range.

* * * * *